United States Patent
Ueno et al.

(10) Patent No.: US 8,914,185 B2
(45) Date of Patent: Dec. 16, 2014

(54) VEHICLE CONTROL DEVICE

(75) Inventors: Koki Ueno, Toyota (JP); Ichiro Kitaori, Nagoya (JP); Takahiko Tsutsumi, Toyota (JP); Hiroatsu Endo, Nagoya (JP); Takashi Yuma, Toyota (JP); Masayuki Matsui, Ichinomiya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 108 days.

(21) Appl. No.: 13/124,981

(22) PCT Filed: Feb. 27, 2009

(86) PCT No.: PCT/JP2009/053678
§ 371 (c)(1),
(2), (4) Date: Apr. 19, 2011

(87) PCT Pub. No.: WO2010/097936
PCT Pub. Date: Sep. 2, 2010

(65) Prior Publication Data
US 2011/0202231 A1 Aug. 18, 2011

(51) Int. Cl.
*B60K 20/02* (2006.01)
*G06F 7/00* (2006.01)
*F16H 61/12* (2010.01)
*F16H 59/10* (2006.01)
*F16H 59/02* (2006.01)

(52) U.S. Cl.
CPC .............. *F16H 61/12* (2013.01); *F16H 59/105* (2013.01); *F16H 2059/0295* (2013.01); *F16H 2061/122* (2013.01); *F16H 2061/1268* (2013.01); *F16H 2061/1284* (2013.01)
USPC .......................................... 701/29.2; 701/41

(58) Field of Classification Search
None
See application file for complete search history.

(56) References Cited

U.S. PATENT DOCUMENTS 5,591,101 A 1/1997 Sakakiyama et al.
5,827,150 A * 10/1998 Mukumoto .................... 477/101
(Continued)

FOREIGN PATENT DOCUMENTS

JP 61-157441 A 7/1986
JP 5-223162 A 8/1993
(Continued)

OTHER PUBLICATIONS

Office Action for related U.S. Appl. No. 13/260,401 mailed Mar. 5, 2013.
(Continued)

*Primary Examiner* — John R Olszewski
*Assistant Examiner* — Jean-Paul Cass
(74) *Attorney, Agent, or Firm* — Sughrue Mion, PLLC

(57) ABSTRACT

An ECU is connected to a multi-system shift sensor detecting a shift lever position in a shift direction associated with detection of the R position, and to a multi-system select sensor detecting a shift lever position in a select direction not associated with detection of the R position. When only one or more, but not all, of sensors in the select sensor are abnormal, the ECU controls the shift range according to the shift position detected based on the remaining proper sensor. When only one or more of sensors in the shift sensor are abnormal, the ECU maintains the current range until an operation of a shift lever is detected, and switches the shift range to the N range at the point of time of detecting an operation of the shift lever.

11 Claims, 7 Drawing Sheets

(56) References Cited

U.S. PATENT DOCUMENTS

| | | | |
|---|---|---|---|
| 5,855,532 A | 1/1999 | Sugiyama | |
| 5,897,601 A | 4/1999 | Suzuki | |
| 6,030,316 A * | 2/2000 | Kadota | 477/121 |
| 6,047,679 A * | 4/2000 | Matsumoto et al. | 123/396 |
| 6,561,950 B1 | 5/2003 | Ohtsuka | |
| 6,655,343 B2 * | 12/2003 | Suzuki et al. | 123/198 D |
| 6,659,911 B2 * | 12/2003 | Suzuki et al. | 477/109 |
| 6,779,508 B2 * | 8/2004 | Fuwa | 123/396 |
| 6,939,266 B2 * | 9/2005 | Koerner et al. | 477/109 |
| 7,367,854 B2 * | 5/2008 | Arvidsson | 440/1 |
| 7,426,854 B2 * | 9/2008 | Endo et al. | 73/115.02 |
| 7,563,197 B2 * | 7/2009 | Ayabe et al. | 477/121 |
| 7,625,313 B2 | 12/2009 | Kondo et al. | |
| 8,032,274 B2 * | 10/2011 | Niwa et al. | 701/31.8 |
| 8,335,619 B2 * | 12/2012 | Ueno | 701/51 |
| 2001/0045138 A1 * | 11/2001 | Ohashi et al. | 74/336 R |
| 2002/0065169 A1 * | 5/2002 | Suzuki et al. | 477/109 |
| 2003/0105572 A1 | 6/2003 | Joe et al. | |
| 2003/0176258 A1 | 9/2003 | Ohtsuka | |
| 2004/0035391 A1 * | 2/2004 | Fuwa | 123/396 |
| 2004/0053743 A1 | 3/2004 | Tsuzuki et al. | |
| 2004/0162661 A1 | 8/2004 | Kikuchi | |
| 2004/0186646 A1 | 9/2004 | Kuwata et al. | |
| 2004/0226801 A1 * | 11/2004 | De Jonge et al. | 192/220.7 |
| 2004/0259685 A1 | 12/2004 | Inoue et al. | |
| 2005/0030009 A1 | 2/2005 | Moreno | |
| 2006/0258503 A1 | 11/2006 | Inoue et al. | |
| 2007/0087896 A1 | 4/2007 | Matsuzaki et al. | |
| 2007/0129214 A1 | 6/2007 | Kondo et al. | |
| 2007/0137337 A1 | 6/2007 | Kim | |
| 2008/0113848 A1 | 5/2008 | Inouse et al. | |
| 2009/0150075 A1 | 6/2009 | Watanabe et al. | |
| 2009/0157251 A1 * | 6/2009 | Niwa et al. | 701/31 |
| 2010/0082209 A1 * | 4/2010 | Yoshioka et al. | 701/62 |
| 2010/0168956 A1 | 7/2010 | Ueno | |
| 2011/0010064 A1 * | 1/2011 | Funakoshi et al. | 701/62 |
| 2011/0125356 A1 * | 5/2011 | Takahashi | 701/22 |
| 2012/0022756 A1 * | 1/2012 | Ueno et al. | 701/58 |
| 2012/0232756 A1 * | 9/2012 | Yuan et al. | 701/41 |
| 2013/0000436 A1 * | 1/2013 | Ueno | 74/473.12 |

FOREIGN PATENT DOCUMENTS

| | | | |
|---|---|---|---|
| JP | 08-303287 A | | 11/1996 |
| JP | 09-152902 A | | 6/1997 |
| JP | 11-245679 | * | 9/1999 |
| JP | 11245679 A | * | 9/1999 |
| JP | 2000-145493 A | | 5/2000 |
| JP | 2001-294056 A | | 10/2001 |
| JP | 2001-304390 A | | 10/2001 |
| JP | 2002-048234 A | | 2/2002 |
| JP | 2002-213600 A | | 7/2002 |
| JP | 2003-065436 A | | 3/2003 |
| JP | 2003-072417 A | | 3/2003 |
| JP | 2003-139227 A | | 5/2003 |
| JP | 2004-251309 A | | 9/2004 |
| JP | 2004-293441 | * | 10/2004 |
| JP | 2004293441 A | * | 10/2004 |
| JP | 2005-007993 A | | 1/2005 |
| JP | 2006-162050 A | | 6/2006 |
| JP | 2006-336717 A | | 12/2006 |
| JP | 2006-349016 A | | 12/2006 |
| JP | 2007-009946 A | | 1/2007 |
| JP | 2007-062664 A | | 3/2007 |
| JP | 2007-192338 A | | 8/2007 |
| JP | 2008-290622 A | | 12/2008 |

OTHER PUBLICATIONS

Office Action for related U.S. Appl. No. 12/601,400 mailed Feb. 28, 2012.

Notice of Allowance for related U.S. Appl. No. 12/601,400 mailed Sep. 24, 2012.

Notice of Allowance issued in U.S. Appl. No. 13/609,617 dated May 8, 2014.

* cited by examiner

| SHIFT POSITION | Vsh REGION | Vse REGION |
|---|---|---|
| R | L | H |
| N | M | H |
| D | H | H |
| M | M | L |
| B | H | L |
| EX | L | L |

F I G. 8
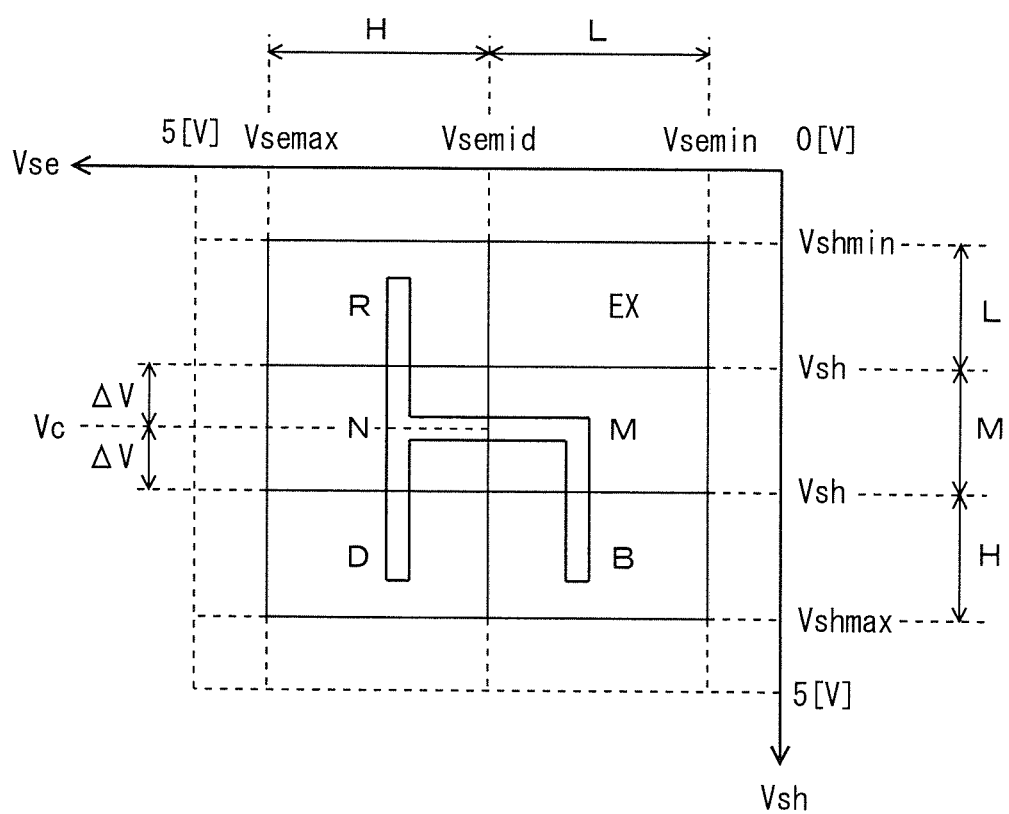

VEHICLE CONTROL DEVICE

CROSS REFERENCE TO RELATED APPLICATIONS:

This application is a National Stage of International Application No. PCT/JP2009/053678filed Feb. 27, 2009, the content of which is incorporated herein by reference in its entirety.

TECHNICAL FIELD

The present invention relates to control for a vehicle, particularly control when abnormality occurs in a sensor detecting the position of the shift lever.

BACKGROUND ART

There is conventionally known a vehicle detecting, by means of a sensor, the position of the shift lever operated by a driver, and switching the control state (shift range) of the automatic transmission according to the detected result of the sensor.

Control in the event of abnormality in a shift lever sensor detecting the position of the shift lever is disclosed in, for example, Japanese Patent Laying-Open No. 5-223162 (Patent Document 1).

Patent Document 1 teaches control such that, in the event of abnormality in the shift lever sensor (shift selection switch) and a wire harness connected thereto, the automatic transmission is set at the neutral state, and under a certain running environment such as when the car is running on an express highway, when the car is stopping at a crossing point, and when the car is at rest without the operator recognizing abnormality, the automatic transmission is not set at the neutral state. According to the technique disclosed in Patent Document 1, the vehicle will not immediately become disabled in driving when abnormality occurs at the shift lever sensor (shift select switch), and allows the vehicle to move under a certain running environment.

Patent Document 1: Japanese Patent Laying-Open No. 5-223162
Patent Document 2: Japanese Patent Laying-Open No. 2001-294056
Patent Document 3: Japanese Patent Laying-Open No. 2002-213600
Patent Document 4: Japanese Patent Laying-Open No. 2003-65436
Patent Document 5: Japanese Patent Laying-Open No. 61-157441
Patent Document 6: Japanese Patent Laying-Open No. 2004-251309

DISCLOSURE OF THE INVENTION

Problems to be Solved by the Invention

According to the technique disclosed in Patent Document 1, however, the vehicle cannot travel in a limp-home mode since the automatic transmission is set at the neutral state at the point of time of abnormality occurring at the shift lever sensor under a running environment other than the aforementioned certain running environment.

The present invention is directed to solving the aforementioned problem. An object of the present invention is to provide a control device that can improve, when abnormality occurs in a sensor detecting the position of the movable unit, the convenience in driving the vehicle in a limp-home mode while avoiding forward/reverse drive switching not intended by the driver by switching the control manner according to the abnormality pattern of the sensor.

Means for Solving the Problems

A control device according to the present invention is directed to a vehicle running by an output from an automatic transmission changing the revolution of a drive force source, and includes a movable unit operated by a driver of the vehicle, configured to allow shifting in a first direction associated with forward/reverse drive switching and a second direction not associated with forward/reverse drive switching, a first detector including a plurality of sensors detecting a position of the movable unit in the first direction, a second detector including a plurality of sensors detecting the position of the movable unit in the second direction, and a control unit controlling at least one of the drive force source and the automatic transmission based on detected results of the first detector and the second detector. The control unit determines whether each sensor of the first detector and each sensor of the second detector is abnormal or not, and in an event of a first abnormality where all the sensors of the first detector are proper, and one or more, but not all, of the sensors of the second detector are abnormal, executing first control allowing the vehicle to drive with the output from the automatic transmission, and in an event of a second abnormality where all the sensors of the second detector are proper and at least one or more of the sensors of the first detector are abnormal, executing second control allowing the vehicle to drive with the output of the automatic transmission more suppressed than during execution of the first control.

Preferably, the control unit executes as the first control, in the event of the first abnormality, control of switching the control state of the automatic transmission based on a detected result of the first detector and a detected result of a remaining proper sensor excluding any abnormal sensor of the second detector, and executes as the second control, in the event of the second abnormality, reduction control of holding the automatic transmission at the control state identical to the control state prior to detection of abnormality of the first detector until a predetermined condition is met, and reducing the output of the automatic transmission lower than during execution of the first control after the predetermined condition is met.

Further preferably, the predetermined condition includes the condition that an operation of the movable unit is detected.

Further preferably, the predetermined condition includes the condition that the detected result of the second detector has changed.

Further preferably, the movable unit is shifted along a shift gate. The predetermined condition includes the condition detecting that a position of the movable unit is at a position not included in a predetermined range corresponding to the shift gate.

Further preferably, the reduction control includes at least one of control of setting the control state of the automatic transmission at a neutral state disconnecting power and control of reducing the output of the drive force source.

Further preferably, the plurality of sensors of the second detector include a main sensor used to ascertain the position in the second direction and a subsensor used to monitor abnormality in the main sensor. When the first control is executed, the control unit switches the control state of the automatic transmission based on the detected result of the first detector and the detected result of the subsensor of the second detector when, in the second detector, the main sensor is abnormal and the subsensor is proper.

Further preferably, the control unit executes, in an event of a third abnormality where an operation of the movable unit cannot be detected occurs in the first detector and the second detector, at least one of the control of setting the control state of the automatic transmission to a neutral state disconnecting power, and control of reducing the output of the drive force source at the point of time of occurrence of the third abnormality.

Further preferably, the control unit determines that the third abnormality has occurred when at least one or more of the sensors of the first detector are abnormal and at least one or more of the sensors of the second detector are abnormal.

Further preferably, the corresponding relationship between the detected result of the first detector and the position in the first direction is learned based on the detected result of the first detector at the point of time of the detected result of the second detector changing. When the first abnormality occurs, the control unit prohibits switching of the control state of the automatic transmission when in at least one of an event of a learning result of the position in the first direction being erased and an event of the control state of the automatic transmission being at a parking state locking the shaft of the vehicle.

Further preferably, in an event of a fourth abnormality where all the sensors of the first detector are proper and all the sensors of the second detector are abnormal, the control unit holds the automatic transmission at the control state identical to the control state prior to detection of abnormality of the second detector until an operation of the movable unit is detected after detection of abnormality in the second detector, and executes, at the point of time of detecting an operation of the movable unit, at least one of control of setting the control state of the automatic transmission at a neutral state of disconnecting the power and control of reducing the output of the drive force source.

Effects of the Invention

According to the present invention, the convenience in the vehicle taking a limp-home mode is improved while avoiding forward/reverse drive switching not intended by the driver.

BRIEF DESCRIPTION OF THE DRAWINGS

FIG. 8 is a third diagram representing a shift position determination region.

Figure 1:
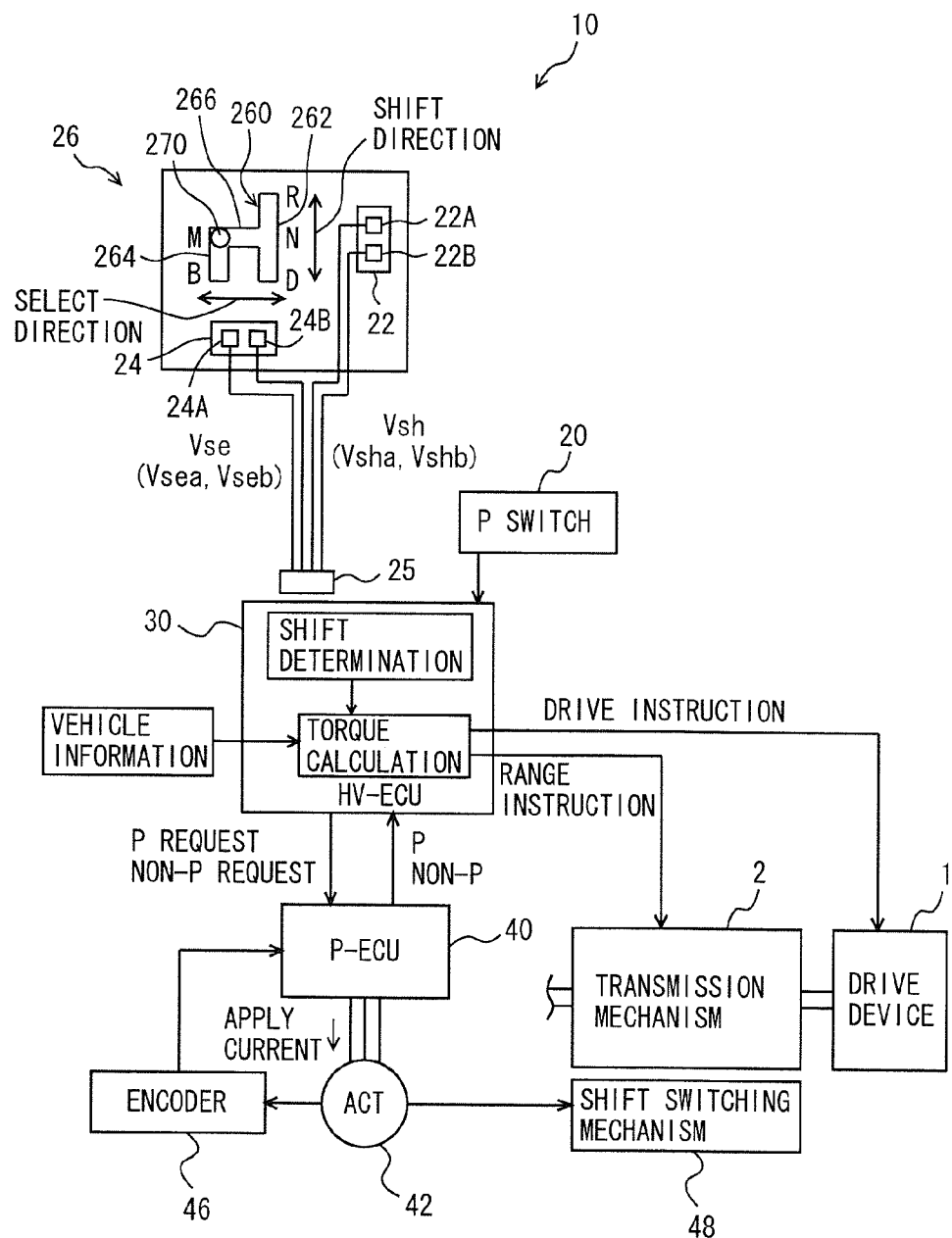
FIG. 1 represents a configuration of a shift control system mounted on a vehicle according to the present embodiment.

DESCRIPTION OF THE REFERENCE CHARACTERS 1 driving device, 2 automatic mechanism, 10 shift control system, 20 switch, 22 shift sensor, 22A shift main sensor, 22B shift subsensor, 24 select sensor, 24A select main sensor, 24B select subsensor, 25 connector, 26 shift lever mechanism, 30 HV-ECU, 40 P-ECU, 42 actuator, 46 encoder, 48 shift switching mechanism, 260 shift gate, 262 first shift path, 264 second shift path, 266 select path, 270 shift lever, 3100 input interface, 3200 processing unit, 3210 abnormality determination unit, 3220 abnormality pattern determination unit, 3230 normal control unit, 3240 fail-safe control unit, 3250 fail-safe control unit, 3260 fail-safe control unit, 3270 fail-safe control unit, 3300 storage unit, 3400 output interface.

BEST MODES FOR CARRYING OUT THE INVENTION

An embodiment of the present invention will be described hereinafter with reference to the drawings. In the description, the same elements have the same reference characters allotted. Their designation and function are also identical. Therefore, detailed description thereof will not be repeated.

FIG. 1 represents a configuration of a shift control system 10 according to the present embodiment. Shift control system 10 of the present embodiment functions as a shift-by-wire system switching, through electric control, the control state (hereinafter, also referred to as "shift range") of a transmission mechanism 2 changing and conveying to a driving wheel the revolution of a drive device 1 (for example, engine) that is the drive force source of the vehicle. The present embodiment will be described based on, but not exclusively, a hybrid vehicle as an example of a vehicle on which shift control system 10 is mounted. Further, the present embodiment will be described with transmission mechanism 2 as a transmission formed of a stepless transmission mechanism. Alternatively, transmission mechanism 2 may be formed of a stepped transmission mechanism.

Shift control system 10 includes a P switch 20, a shift lever mechanism 26, an HV (Hybrid Vehicle)-ECU (Electronic Control Unit) 30, a parking control device (hereinafter, also referred to as "P-ECU") 40, an actuator 42, an encoder 46, and a shift switching mechanism 48.

P switch 20 is a momentary switch to modify the shift range to a parking range (hereinafter, also referred to as "P range"). The driver enters an instruction to switch the shift range to the P range through P switch 20. A P instruction signal indicating an instruction from the driver, received at P switch 20, is transmitted to HV-ECU 30. It is to be noted that the shift range may be switched from a non-P range to a P range by an element other than such a P switch 20.

The switching from the P range to a shift range other than the P range (hereinafter, also referred to as "non-P range") is carried out by operating a shift lever 270 (described afterwards). The shift range may be switched from the P range to a non-P range by, instead of such an operation through shift lever 270, an operation of P switch 20.

Shift lever mechanism 26 is formed of a shift gate 260, a shift lever 270, a shift sensor 22, and a select sensor 24.

Shift gate 260 includes first and second shift paths 262 and 264 each formed along a shift direction (refer to FIG. 1), and a select path 266 formed along the select direction (refer to FIG. 1), connecting first shift path 262 with second shift path 264.

The first shift path 262 includes a reverse position (R position) located at the upper end, a drive position (D position) located at the lower end, and a neutral position (N position) located at the middle (the position in connection with select path 266).

Second shift path 264 includes an intermediate position (M position) located at the upper end (the position connecting with select path 266), and a brake position (B position) located at the lower end. Select path 266 connects the N position of the first shift path 262 with the M position of the second shift path 264.

In the case where shift lever 270 is moved in the shift direction, the position of shift lever 270 (hereinafter, also referred to as "shift position" hereinafter) may be switched between the R position and D position, i.e. switched between the forward drive and reverse drive of the vehicle. In the case where shift lever 270 is moved in the select direction, switching between at least the R position and D position will not occur. The vehicle will not be switched between the forward drive and reverse drive.

Shift lever 270 is a momentary type shift lever maintained at the M position when there is no operation by the driver, and moved along the path formed at shift gate 260 in response to an operation by the driver. The configuration and operation of a momentary type shift lever is well known, and detailed description thereof will not be provided here. Moreover, shift lever 270 is not limited to the momentary type.

Shift sensor 22 detects a voltage signal according to the position of shift lever 270 in the shift direction (refer to FIG. 1). Shift sensor 22 is a multi-system sensor. In the present embodiment, shift sensor 22 includes sensors of two systems, i.e. a shift main sensor 22A and a shift subsensor 22B. Shift sensor 22 may include sensors equal to or greater than two systems.

Shift main sensor 22A and shift subsensor 22B detect shift voltage values Vsha and Vshb, respectively, according to the position of shift lever 270 in the shift direction. The detected result is output to HV-ECU 30. When both of shift main sensor 22A and shift subsensor 22B are proper, shift voltage value Vsha and shift voltage value Vshb take the same value.

Shift voltage value Vsha detected by shift main sensor 22A is used mainly by HV-ECU 30 to ascertain the position of shift lever 270 in the shift position. Shift voltage value Vshb detected by shift subsensor 22B is used mainly by HV-ECU 30 to monitor abnormality in shift voltage value Vsha (abnormality in shift main sensor 22A). In the case where it is not necessary to distinguish between shift voltage value Vsha and shift voltage value Vshb in the description hereinafter, the shift voltage value will be generically indicated as Vsh without difference therebetween.

Shift voltage value Vsh takes a value within a range from a lower limit Vshmin to an upper limit Vshmax corresponding to the boundary of the range in which shift lever 270 can move in the shift direction. In the present embodiment, each of lower limit Vshmin and upper limit Vshmax takes a voltage value at least within the range of approximately 0 to 5 volts.

The relationship between the position of shift lever 270 in the shift direction and shift voltage value Vsh is, for example, linear. The relationship does not have to be linear as long as the position of shift lever 270 in the shift direction can be computed based on shift voltage value Vsh.

Select sensor 24 detects a voltage signal according to the position of shift lever 270 in the select direction (refer to FIG. 1). Select sensor 24 is a multi-system sensor. In the present embodiment, select sensor 24 includes sensors of two systems, i.e. a select main sensor 24A and a select subsensor 24B. Select sensor 24 may include sensors equal to or greater than two systems.

Select main sensor 24A and select subsensor 24B detect select voltage values Vsea and Vseb, respectively, according to the position of shift lever 270 in the select direction. The detected results are output to HV-ECU 30. When both of select main sensor 24A and select subsensor 24B are proper, select voltage value Vsea and select voltage value Vseb take the same value.

Select voltage value Vsea detected by select main sensor 24A is mainly used by HV-ECU 30 to ascertain the position of shift lever 270 in the select direction. Select voltage value Vseb detected by select subsensor 24B is mainly used by HV-ECU 30 to monitor abnormality in select voltage value Vsea (abnormality in select main sensor 24A). In the case where it is not necessary to distinguish between select voltage value Vsea and select voltage value Vseb in the description hereinafter, the select voltage value will be generically indicated as Vse without difference therebetween.

Select voltage value Vse takes a value within a range from a lower limit Vsemin to an upper limit Vsemax corresponding to the boundary of the range in which shift lever 270 can move in the select direction. In the present embodiment, each of lower limit Vsemin and upper limit Vsemax takes a voltage value at least within the range of approximately 0 to 5 volts.

The relationship between the position of shift lever 270 in the select direction and select voltage value Vse is, for example, linear. The relationship does not have to be linear as long as the position of shift lever 270 in the select direction can be computed based on select voltage value Vse.

Shift main sensor 22A, shift subsensor 22B, select main sensor 24A and select subsensor 24B are connected to a connector 25. By inserting connector 25 to the connector (not shown) of the HV-ECU 30 side, each of shift main sensor 22A, shift subsensor 22B, select main sensor 24A and select subsensor 24B are electrically connected to HV-ECU 30.

HV-ECU 30 generically monitors the operation of shift control system 10 based on respective outputs from P switch 20, shift sensor 22, and select sensor 24.

HV-ECU 30 determines the shift position based on shift voltage value Vsh from shift sensor 22 and select voltage value Vse from select sensor 24.

When the position of shift lever 270 is shifted to a position other than the M position and maintained at that shifted position until an elapse of a predetermined recognition time, HV-ECU 30 ascertains the shift position corresponding to the shifted position.

Figures 2, 3:
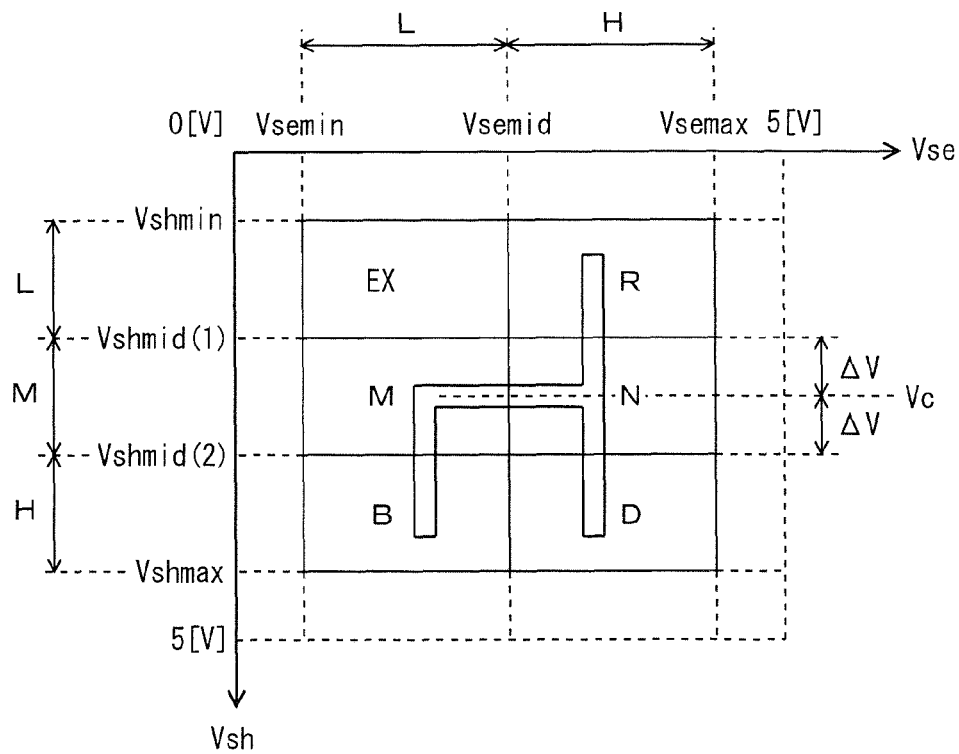
FIG. 2 is a first diagram representing a shift position determination region.
FIG. 3 is a second diagram representing a shift position determination region.
Figure 4:
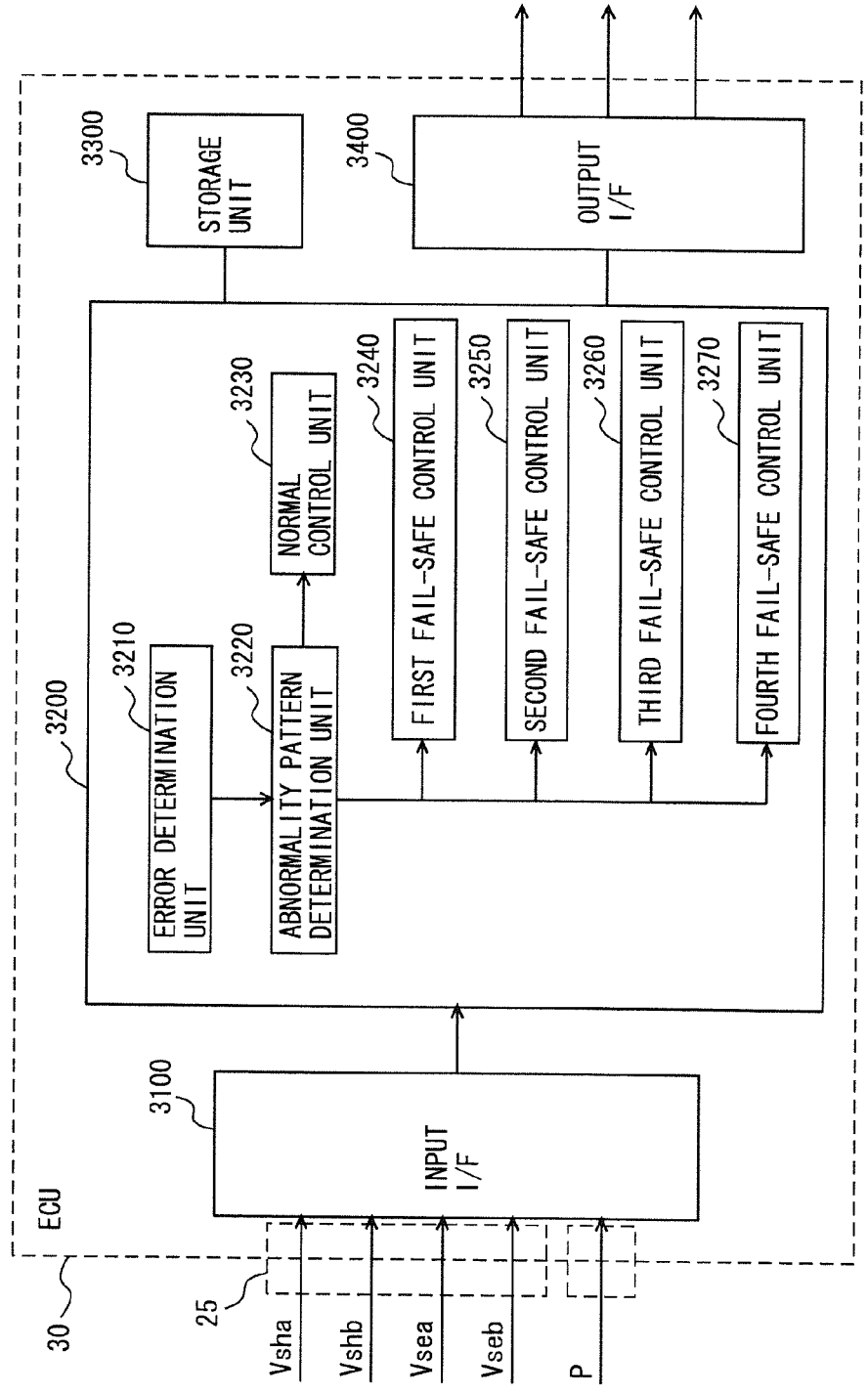
FIG. 4 is a functional block diagram of an ECU.

HV-ECU 30 has a map as shown in FIGS. 2 and 3 to detect the shift position based on shift voltage value Vsh and select voltage value Vse, for example, stored in a storage unit 3300 (refer to FIG. 4).

As shown in FIG. 2, an upper limit Vshmax and a lower limit Vshmin are set for the boundary of the movable range in the shift direction. An upper limit Vsemax and a lower limit Vsemin are set for the boundary of the movable range in the select direction.

A threshold value Vsemid is set between upper and lower limits Vsemax and Vsemin. Upper limit Vsemax, lower limit Vsemin, and threshold value Vsemid are set in the range from 0 to 5 volts.

A threshold value Vshmid (1) and a threshold value Vshmid (2) (>Vshmid (1)) are set between upper and lower limits Vshmax and Vshmin. Upper limit Vshmax, lower limit Vshmin, threshold value Vshmid (1) and threshold value Vshmid (2) are set within the range from 0 to 5 volts.

HV-ECU 30 learns and stores in internal storage unit 3300 (refer to FIG. 4) a shift voltage value Vsh when shift lever 270 is positioned on select path 266 (for example, when select voltage value Vse changes) as reference voltage value VC, and sets reference voltage value VC minus a predetermined value ΔV as threshold value Vshmid (1), and reference voltage value VC plus predetermined value ΔV as threshold value Vshmid (2). Therefore, threshold value Vshmid (1) and threshold value Vshmid (2) vary depending upon the learned result of reference voltage value VC. Reference voltage value VC is erased from storage unit 3300 when power supply from a battery not shown is cut off (for example, when the battery is removed from the vehicle).

HV-ECU 30 determines whether or not shift voltage value Vsh resides in a shift L region between Vshmin and Vshmid (1), a shift M region between Vshmid (1) and Vshmid (2), and a shift H region between Vshmid (2) and Vshmax.

HV-ECU 30 determines whether or not select voltage value Vse resides in a select L region between Vsemin and Vsemid, and a select H region between Vsemid and Vsemax.

As shown in FIG. 3, when shift voltage value Vsh resides in the shift L region and select voltage value Vse resides in the select H region, HV-ECU 30 detects that the shift position is at the R position.

When shift voltage value Vsh resides in the shift M region and select voltage value Vse resides in the select H region, HV-ECU 30 detects that the shift position is at the N position.

When shift voltage value Vsh resides in the shift H region and select voltage value Vse resides in the select H region, HV-ECU 30 detects that the shift position is at the D position.

When shift voltage value Vsh resides in the shift M region and select voltage value Vse resides in the select L region, HV-ECU 30 detects that the shift position is at the M position.

When shift voltage value Vsh resides in the shift region H and select voltage value Vse resides in the select region L, HV-ECU 30 detects that the shift position is at the B position.

When shift voltage value Vsh resides in the shift L region and select voltage value Vse resides in the select L region, HV-ECU 30 detects that the shift position is at the EX position. An EX position will not be detected as long as shift voltage value Vsh and select voltage value Vse take proper values.

HV-ECU 30 calculates the request torque based on the vehicle information (for example, the accelerator pedal position) to output a drive instruction according to the request torque to drive device 1, and ascertains the shift position based on the detected results of shift sensor 22 and select sensor 24 to output a range instruction according to the ascertained shift position to transmission mechanism 2. Accordingly, the output torque of drive device 1 is controlled to a level according to the request torque, and the shift range of transmission mechanism 2 is switched to a range (any of D range, N range, R range, and B range) corresponding to the ascertained shift position. In the D range, the vehicle moves forward. In the R range, the vehicle moves backward. In the N range, power transmission of transmission mechanism 2 is cut off.

In response to reception of a P instruction signal from P switch 20, HV-ECU 30 transmits a P request signal towards P-ECU 40.

P-ECU 40 is connected to allow communication with HV-ECU 30. Upon receiving a P instruction signal or a non-P instruction signal from HV-ECU 30, P-ECU 40 controls the operation of actuator 42 driving shift switching mechanism 48 in order to switch the shift range between the P range and non-P range.

Actuator 42 is formed of a switched reluctance motor (hereinafter, denoted as "SR motor") to drive shift switching mechanism 48 according to a control signal from P-ECU 40. In response to reception of a P instruction signal from P-ECU 40, actuator 42 drives shift switching mechanism 48 to set the shift range to the P range, specifically to a parking lock state (hereinafter, also referred to as "P lock state") for locking the axle by engagement between a parking gear and a parking pole constituting a parking mechanism not shown.

In the vehicle of the present embodiment, control is employed to automatically switch the shift range to the P range (hereinafter, also referred to as "auto P control") when the vehicle power is off (when the ignition switch not shown is turned off).

In response to reception of a non-P instruction signal from P-ECU 40, actuator 42 drives shift switching mechanism 48 to cancel the P lock state. Although actuator 42 is described as being constituted of a motor in the present invention, actuator 42 may be configured hydraulically.

Encoder 46 rotates integrally with actuator 42 to detect the rotating status of the SR motor. Encoder 46 of the present embodiment is a rotary encoder providing signal outputs of the A phase, B phase and Z phase.

P-ECU 40 obtains the signal output from encoder 46 to identify the SR motor rotation state to control the applied current to drive the SR motor, and transmits to HV-ECU 30 either a signal indicating a currently P lock state (P detection signal) or a signal indicating that the P lock state is currently cancelled (non-P detection signal).

The present invention is characterized in that, according to the vehicle based on the configuration set forth above, limp-home control is performed according to a combination of the abnormality in shift sensor 22 and select sensor 24 when abnormality occurs in at least one of shift sensor 22 and select sensor 24.

Conventionally, fail-safe control of switching the shift range to the N range was executed at the point of time when abnormality occurs in at least one of shift sensor 22 and select sensor 24. In the present invention, the abnormality pattern of shift sensor 22 and select sensor 24 is identified, and when the identified abnormality pattern is one that allows limp-home travel, the drive of the vehicle is continued wherever possible by carrying out limp-home travel according to the abnormality pattern even after occurrence of abnormality.

FIG. 4 represents a functional block diagram of HV-ECU 30 according to the present embodiment. HV-ECU 30 includes an input interface 3100, a processing unit 3200, a storage unit 3300, and an output interface 3400.

Input interface 3100 receives and transmits to processing unit 3200 shift voltage values Vsha and Vshb from shift sensor 22 (shift main sensor 22A, shift subsensor 22B) and select voltage values Vsea and Vseb from select sensor 24 (select main sensor 24A, select subsensor 24B).

Storage unit 3300 stores various information, programs, threshold values, maps and the like, and has data read out from processing unit 3200 to be stored, as necessary. The information stored in storage unit 3300 includes the history of the shift position and shift range, in addition to the aforementioned maps shown in FIGS. 2 and 3 as well as the learned value of reference voltage value VC.

Processing unit 3200 includes an abnormality determination unit 3210, an abnormality pattern determination unit 3220, a normal control unit 3230, a first fail-safe control unit 3240, a second fail-safe control unit 3250, a third fail-safe control unit 3260, and a fourth fail-safe control unit 3270.

Abnormality determination unit 3210 determines whether each of shift main sensor 22A, shift subsensor 22B, select main sensor 24A and select subsensor 24B is abnormal or not.

Abnormality determination unit 3210 determines that shift main sensor 22A is proper when Vshmin<Vsha<Vshmax and that shift main sensor 22A is abnormal when Vsha<Vshmin or Vsha>Vshmax. Similarly, abnormality determination unit 3210 determines that shift subsensor 22B is proper when Vshmin<Vshb<Vshmax and that shift subsensor 22B is abnormal when Vshb<Vshmin or Vshb>Vshmax.

Abnormality determination unit 3210 determines that select main sensor 24A is proper when Vsemin<Vsea<Vsemax and that select main sensor 24A is abnormal when Vsea<Vsemin or Vsea>Vsemax. Similarly, abnormality determination unit 3210 determines that select subsensor 24B is proper when Vsemin<Vseb<Vsemax and that select subsensor 24B is abnormal when Vseb<Vsemin or Vseb>Vsemax.

Abnormality may be determined using another method as long as the method can determine abnormality in each of the sensors.

Abnormality pattern determination unit 3220 breaks up the determination results from abnormality determination unit 3210 into first to fourth abnormality patterns. The break-up method of the abnormality patterns set forth below is by way of example only, and the number of abnormality patterns and break-up method are not limited thereto.

Abnormality pattern determination unit 3220 identifies the first abnormality pattern when all the sensors of shift sensor 22 (shift main sensor 22A and shift subsensor 22B) are proper, and one of the sensors of select sensor 24 (either select main sensor 24A or select subsensor 24B) is abnormal.

Abnormality pattern determination unit 3220 identifies the second abnormality pattern when all the sensors of select sensor 24 (select main sensor 24A and select subsensor 24B) are proper, and at least one or more of the sensors of shift sensor 22 (at least one of shift main sensor 22A and shift subsensor 22B) are abnormal.

Abnormality pattern determination unit 3220 identifies the third abnormality pattern when at least one or more of the sensors of shift sensor 22 (at least one of shift main sensor 22A and shift subsensor 22B) are abnormal, and at least one or more of the sensors of select sensor 24 (at least one of select main sensor 24A and select subsensor 24B) are abnormal.

Abnormality pattern determination unit 3220 identifies the fourth abnormality pattern when all the sensors of shift sensor 22 (shift main sensor 22A and shift subsensor 22B) are proper, and all the sensors of select sensor 24 (select main sensor 24A and select subsensor 24B) are abnormal.

In the case where abnormality pattern determination unit 3220 does not identify any of the first to fourth abnormality patterns, i.e. when all the sensors of shift sensor 22 (shift main sensor 22A and shift subsensor 22B) and all the sensors of select sensor 24 (select main sensor 24A and select subsensor 24B) are proper, normal control unit 3230 executes normal control. In normal control, the shift position is ascertained based on shift voltage value Vsha from shift main sensor 22A and select voltage value Vsea from select main sensor 24A, and the shift range is controlled according to the ascertained shift position.

First fail-safe control unit 3240 executes first fail-safe control when abnormality pattern determination unit 3220 identifies the first abnormality pattern. According to the first abnormality pattern, all the sensors of shift sensor 22 (shift main sensor 22A and shift subsensor 22B) associated with forward/reverse drive switching are proper, and the forward/reverse drive switching will not be carried out against the driver's intention. Further, one sensor of select sensor 24 is normal.

Accordingly, in the first fail-safe control, the shift position is ascertained based on shift voltage value Vsh and the detected value of a proper one of select main sensor 24A and select subsensor 24B that is not abnormal. Then, likewise with normal control, the shift range is controlled according to the ascertained shift position.

When abnormality pattern determination unit 3220 identifies the second abnormality pattern, second fail-safe control unit 3250 executes second fail-safe control. According to the second abnormality pattern, there is a possibility of the forward/reverse drive switching being carried out against the driver's intention due to at least one of more of the sensors of shift sensor 22 associated with forward/reverse drive switching being abnormal although both of sensors of select sensor 24 not associated with forward/reverse drive switching are proper.

Therefore, in the second fail-safe control, the current range (current shift range) is maintained until an operation of shift lever 270 in the select direction is detected (until there is a change in select voltage value Vse). At the point of time of detecting an operation of shift lever 270 in the select direction (the point of time when select voltage value Vse changes), the shift range is switched to the N range and torque down (for example, fuel cut) of drive device 1 is implemented. Alternatively, either the control of switching the shift range to the N range or the torque down control of drive device 1 may be implemented. In the second fail-safe control, the shift range is switched to the N range, even if before detection of an operation of shift lever 270 in the select direction, when the current range is at the R range.

When abnormality pattern determination unit 3220 identifies a third abnormality pattern, third fail-safe control unit 3260 executes third fail-safe control. According to the third abnormality pattern, there is a possibility of the forward/reverse drive switching being carried out against the driver's intention due to at least one of more of the sensors of shift sensor 22 associated with forward/reverse drive switching being abnormal. There is also a possibility of an erroneous detection of an operation of shift lever 270 in the select direction since at least one or more of the sensors of select sensor 24 are abnormal. Moreover, there is a possibility of connector 25 being disconnected from HV-ECU 30 since abnormality is identified in sensors across both of shift sensor 22 and select sensor 24.

In the third fail-safe control, the shift range is switched to the N range and torque down of drive device 1 is implemented at the point of time of abnormality pattern determination unit 3220 identifying the third abnormality pattern. Alternatively, either the control of switching the shift range to the N range or the torque down control of drive device 1 may be implemented.

Fourth fail-safe control unit 3270 executes fourth fail-safe control when abnormality pattern determination unit 3220 identifies a fourth abnormality pattern. According to the fourth abnormality pattern, there is no possibility of forward/reverse drive switching being carried out against the driver's intention since all the sensors of shift sensor 22 associated with the forward/reverse drive switching are proper. However, there is a high possibility of detecting a shift position not intended by the driver since all the sensors of select sensor 24 are abnormal.

Therefore, in the fourth fail-safe control, the current range is maintained until an operation of shift lever 270 in the shift direction is detected (until there is a change in shift voltage value Vsh). At the point of time of detecting an operation of shift lever 270 in the shift direction (the point of time when shift voltage value Vsh changes), the shift range is switched to the N range, and torque down of drive device 1 is implemented. Alternatively, either the control of switching the shift range to the N range or the torque down control of drive device 1 may be implemented.

When the current range is at the P range, control of maintaining the P range is executed preferentially even in the case of occurrence of the second to fourth abnormality patterns.

The function set forth above may be implemented in software, or in hardware.

Figure 5:
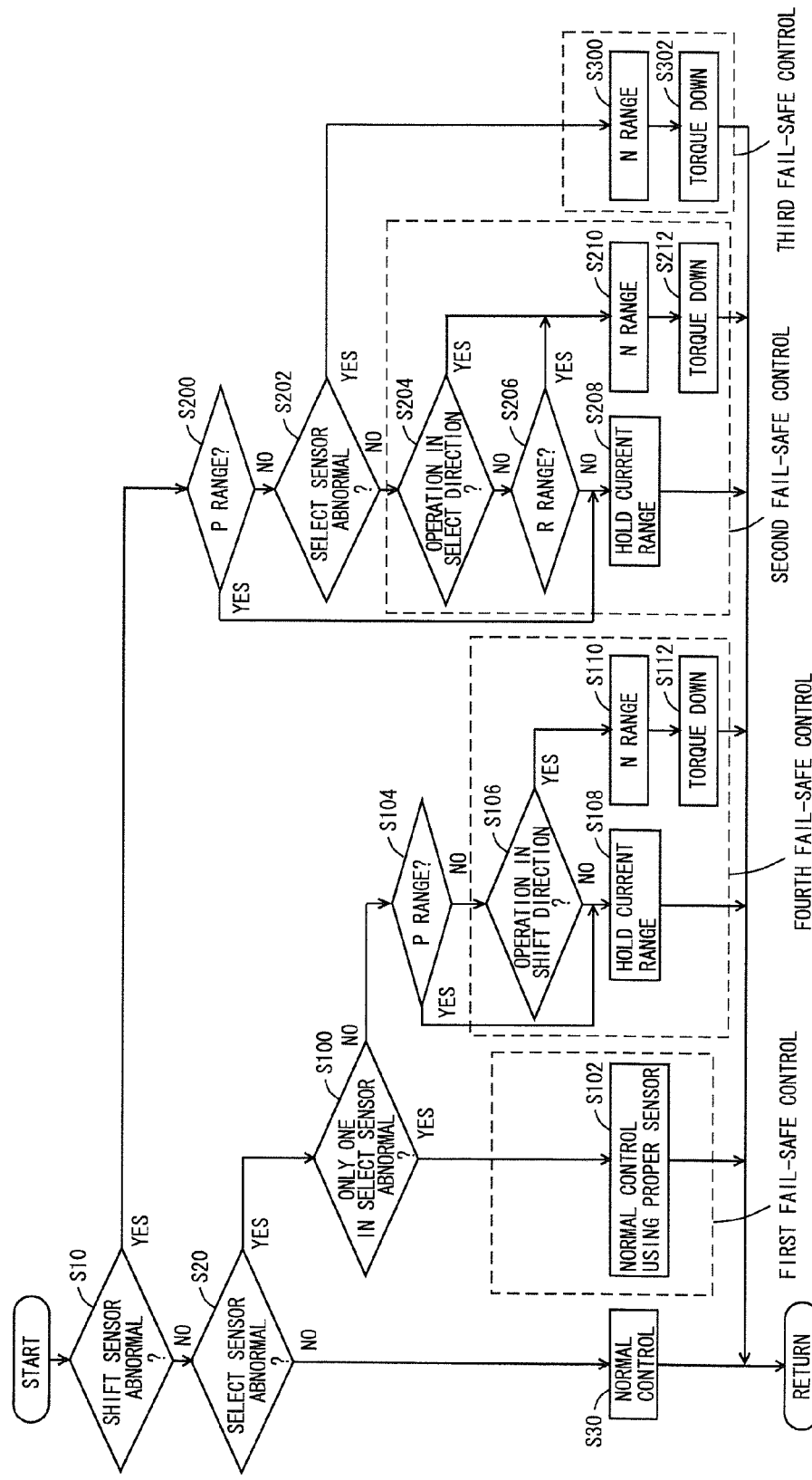
FIG. 5 is a first diagram representing an ECU processing flow.

FIG. 5 represents the processing flow of HV-ECU 30 when the function set forth above is implemented in software. The processing is repeatedly carried out at a predetermined cycle time.

At step (hereinafter, abbreviated as S hereinafter) 10 in FIG. 5, HV-ECU 30 determines whether at least one or more of the sensors of shift sensor 22 are abnormal or not. When at least one or more of the sensors of shift sensor 22 are abnormal (YES at S10), control proceeds to S200. When all the sensors of shift sensor 22 are proper (NO at S10), control proceeds to S20

At S20, HV-ECU 30 determines whether at least one or more of the sensors of select sensor 24 are abnormal or not. When at least one or more of the sensors of select sensor 24 are abnormal (YES at S20), control proceeds to S100. When all the sensors of select sensor 24 are proper (NO at S20), control proceeds to S30 in accordance with the determination of not being pertinent to any of the first to fourth abnormality patterns set forth above.

At S30, HV-ECU 30 executes the aforementioned normal control. Specifically, HV-ECU 30 ascertains the shift position based on shift voltage value Vsha and select voltage value Vsea to control the shift range according to the ascertained shift position.

At S100, HV-ECU 30 determines whether only one of the sensors of select sensor 24 is abnormal or not. When only one of the sensors of select sensor 24 is abnormal (YES at S100), HV-ECU 30 identifies the aforementioned first abnormality pattern, and executes the processing of S102 corresponding to the first fail-safe control. When all the sensors of select sensor 24 are abnormal (NO at S100), HV-ECU 30 identifies the aforementioned fourth abnormality pattern, and executes the processing of S104 to S112 corresponding to the fourth fail-safe control.

At S102, HV-ECU 30 ascertains the shift position based on shift voltage value Vsha and the detected result of the proper sensor, i.e. the one that is not abnormal among select main sensor 24A and select subsensor 24B, and controls the shift range according to the ascertained shift position, likewise with normal control. For example, when select main sensor 24A is abnormal and select subsensor 24B is proper, the shift position is ascertained based on shift voltage value Vsha and select voltage value Vshb (the detected result of select subsensor 24B directed to monitoring, not generally used in ascertaining the position in the select direction).

At S104, HV-ECU 30 determines whether the current range is at the P range. When the current range is at the P range (YES at S104), control proceeds to S108, otherwise (NO at S104), control proceeds to S106.

At S106, HV-ECU 30 determines whether there was an operation of shift lever 270 in the shift direction. For example, determination is made of an operation of shift lever 270 in the shift direction when shift voltage value Vsh changes more greatly than a predetermined amount. When there is an operation of shift lever 270 in the shift direction (YES at S106), control proceeds to S110. When there is no operation in the shift direction (NO at S106), control proceeds to S108.

At S108, HV-ECU 30 maintains the shift range at the current range. At S110, HV-ECU 30 switches the shift range to the N range. At S112, HV-ECU 30 reduces the output torque of drive device 1.

At S200, HV-ECU 30 determines whether the current range is at the P range or not. When the current range is at the P range (YES at S200), control proceeds to S208, otherwise (NO at S200), control proceeds to S202.

At S202, HV-ECU 30 determines whether at least one or more of the sensors of select sensor 24 are abnormal or not. When HV-ECU 30 determines that at least one or more of the sensors of select sensor 24 are abnormal (YES at S202), the aforementioned third abnormality pattern is identified, and the processing of S300-S302 corresponding to the third fail-safe control is executed. When all the sensors of select sensor 24 are proper (NO at S202), HV-ECU 30 identifies the aforementioned second abnormality pattern, and executes the processing of S204-S212 corresponding to the second fail-safe control.

At S204, HV-ECU 30 determines whether there was an operation of shift lever 270 in the select direction. For example, determination is made of an operation of shift lever 270 in the select direction when select voltage value Vse changes more greatly than a predetermined amount. When there is an operation of shift lever 270 in the select direction (YES at S204), control proceeds to S210. When there is no operation in the select direction (NO at S204), control proceeds to S206.

At S206, HV-ECU 30 determines whether the current range is at the R range or not. When the current range is at the R range (YES at S206), control proceeds to S210, otherwise (NO at S206), control proceeds to S208.

At S208, HV-ECU 30 maintains the shift range at the current range. At S210, HV-ECU 30 switches the shift range to the N range. At S212, HV-ECU 30 reduces the output torque of drive device 1.

At S300, HV-ECU 30 switches the shift range to the N range. At S302, HV-ECU 30 reduces the output torque of drive device 1.

An operation of HV-ECU 30 according to the present embodiment based on the configuration and flowchart set forth above will be described hereinafter.

<When Only One or More, but not all, of the Sensors of Select Sensor 24 are Abnormal>

For example, consider the case where abnormality occurs in select main sensor 24A, and all of shift main sensor 22A, shift subsensor 22B and select subsensor 24B are proper (NO at S10, YES at S20, YES at S100) during forward driving at the D range. This abnormality pattern corresponds to the aforementioned first abnormality pattern.

In this case, both sensors of shift sensor 22 associated with detection of the R position are proper. At least the position of shift lever 270 in the shift direction is not detected erroneously. Therefore, even in the case where the position of shift lever 270 in the select direction is ascertained based on the detected result from the remaining proper select subsensor 24B in select sensor 24, at least the switching of the shift range from the D range to the R range, against the driver's intention, will not occur.

Thus, HV-ECU 30 executes the first fail-safe control. Specifically, HV-ECU 30 ascertains the shift position based on shift voltage value Vsh (shift voltage value Vsha) and select voltage value Vshb that is the detected value of select subsensor 24B for monitoring, generally not used for ascertaining the position in the select direction. The shift range is controlled according to the ascertained shift position, likewise with normal control (S102).

Thus, the vehicle can be run in a limp-home mode under a control manner similar to that of normal control (S30) while avoiding switching to the R range, not intended by the driver.

<When at Least One or More of the Sensors of Shift Sensor 22 are Abnormal>

Consider the case where shift subsensor 22B is abnormal and, and all the other shift main sensor 22A, select main sensor 24A and select subsensor 24B are proper (YES at S10, NO at S200, and NO at S202) during forward drive at the D range. This abnormality pattern corresponds to the second abnormality pattern set forth above.

In this case, shift subsensor 22B associated with the detection of the R position is abnormal. Therefore, shift voltage value Vsha cannot be monitored based on shift voltage value Vshb, and the reliability of shift voltage value Vsha cannot be verified. There might be the possibility of the shift range being shifted to the R range from the D range, against the driver's intention. In contrast, the operation of shift lever 270 in the select operation can be detected correctly since select sensor 24 is proper.

Therefore, HV-ECU 30 executes the second fail-safe control. Specifically, HV-ECU 30 maintains the current range at the D range until an operation of shift lever 270 in the select direction is detected based on select voltage value Vse (NO at S204, NO at S206, S208). Accordingly, the running of the vehicle can be continued even if there is an abnormal sensor in shift sensor 22 related to detection of the R position, allowing the vehicle to be moved to a safe site.

At the point of time of detecting an operation of shift lever 270 in the select direction, HV-ECU 30 switches the shift range to the N range, and reduces the output torque of drive device 1 (YES at S204, S210, S212). Accordingly, the driving force in the forward direction or backward direction, generated by erroneous detection of the shift position, can be suppressed appropriately.

<When Shift Sensor 22 and Select Sensor 24 are Abnormal>

Consider the case where abnormality occurs in shift subsensor 22B and select subsensor 24B during forward driving at the D range (YES at S10, NO at S200, YES at S202). This abnormality pattern corresponds to the third abnormality pattern set forth above.

In this case, there is a possibility of being switched to the R range against the driver's intention since there is an abnormal sensor in shift sensor 22 associated with the detection of the R position. Further, since one or more of the sensors of select sensor 24 are abnormal, the operation of shift lever 270 in the shift direction, as well as in the select direction, cannot be detected properly. Moreover, in consideration of abnormality occurring in sensors across both of shift sensor 22 and select sensor 24, there is a possibility of connector 25 being disconnected from HV-ECU 30.

Accordingly, HV-ECU 30 executes the third fail-safe control. Specifically, at the point of time of abnormality occurring in the sensors in both of shift sensor 22 and select sensor 24, HV-ECU 30 switches the shift range to the N range and reduces the output torque of drive device 1 (S300, S302). Accordingly, the driving force in the forward direction or backward direction, generated by erroneous detection of the shift position, can be suppressed appropriately.

<When Shift Sensor 22 is Proper, and Both Sensors of Select Sensor 24 are Abnormal>

For example, consider the case where select main sensor 24A and select subsensor 24B are both abnormal and both of sensors of shift sensor 22 are proper during forward driving at the D range (NO at S10, YES at S20, NO at S100 and NO at S104). This pattern corresponds to the fourth abnormality pattern set forth above.

In this case, both of the sensors of shift sensor 22 associated with detection of the R position are proper. The position of shift lever 270 in the shift direction can be detected properly. Therefore, there is no possibility of being switched to the R range against the driver's intention. However, since both of the sensors of select sensor 24 are abnormal, the possibility of detection of a shift position not intended by the driver is high.

Thus, HV-ECU 30 executes the fourth fail-safe control. Specifically, HV-ECU 30 maintains the current range at the D range until an operation of shift lever 270 in the shift direction is detected based on shift voltage value Vsh (NO at S106, S108). Accordingly, the running of the vehicle can be continued, even when both of sensors of select sensor 24 are abnormal, allowing the vehicle to move to a safe site.

At the point of time of detecting an operation of shift lever 270 in the shift direction, HV-ECU 30 switches the shift range to the N range, and reduces the output torque of drive device 1 (YES at S106, S110, S112). Accordingly, the driving force in the forward direction or backward direction generated by an erroneous detection of the shift position can be suppressed appropriately.

When abnormality occurs in at least one of the shift sensor and select sensor according to the control device of the present embodiment, an abnormality pattern of the shift sensor and select sensor is identified, and limp-home running according to the identified abnormality pattern is implemented. Thus, the convenience of causing the vehicle to run in a limp-home mode can be improved while suppressing generation of a driving force in the forward direction and backward direction against the driver's intention.

The control of HV-ECU 30 set forth above allows various modifications.

Figure 6:
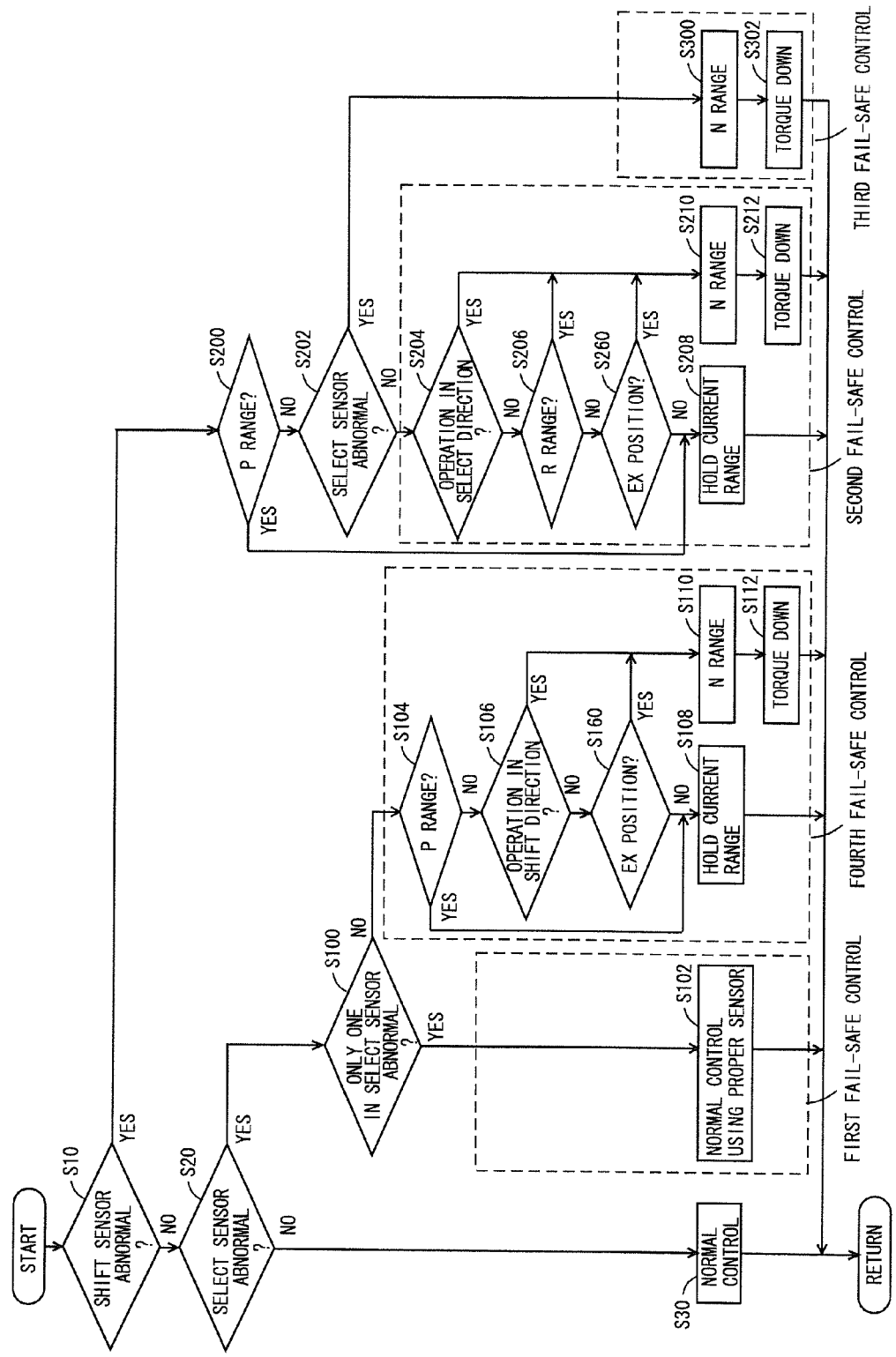
FIG. 6 is a second diagram representing an ECU processing flow.

For example, as shown in FIG. 6, the processing of S160 and S260 may be added to the processing flow of FIG. 5. Specifically, HV-ECU 30 determines whether the current shift position is at an EX position or not (S260) during second fail-safe control. When the current shift position is at the EX position (YES at S260), the shift range may be switched to the N range (S210) even in the case where shift lever 270 is not operated in the select direction (NO at S204).

Similarly, HV-ECU 30 determines whether the current shift position is at the EX position during the fourth fail-safe control (S160). When the current shift position is at the EX position (YES at S160), the shift range may be switched to the N range (S110) even in the case where shift lever 270 is not operated in the shift direction (NO at S106).

Thus, by shifting the shift range to the N range at the time of point of detecting the EX position that is generally not detected, a forward/reverse drive switching against the driver's intention can be prevented.

Figure 7:
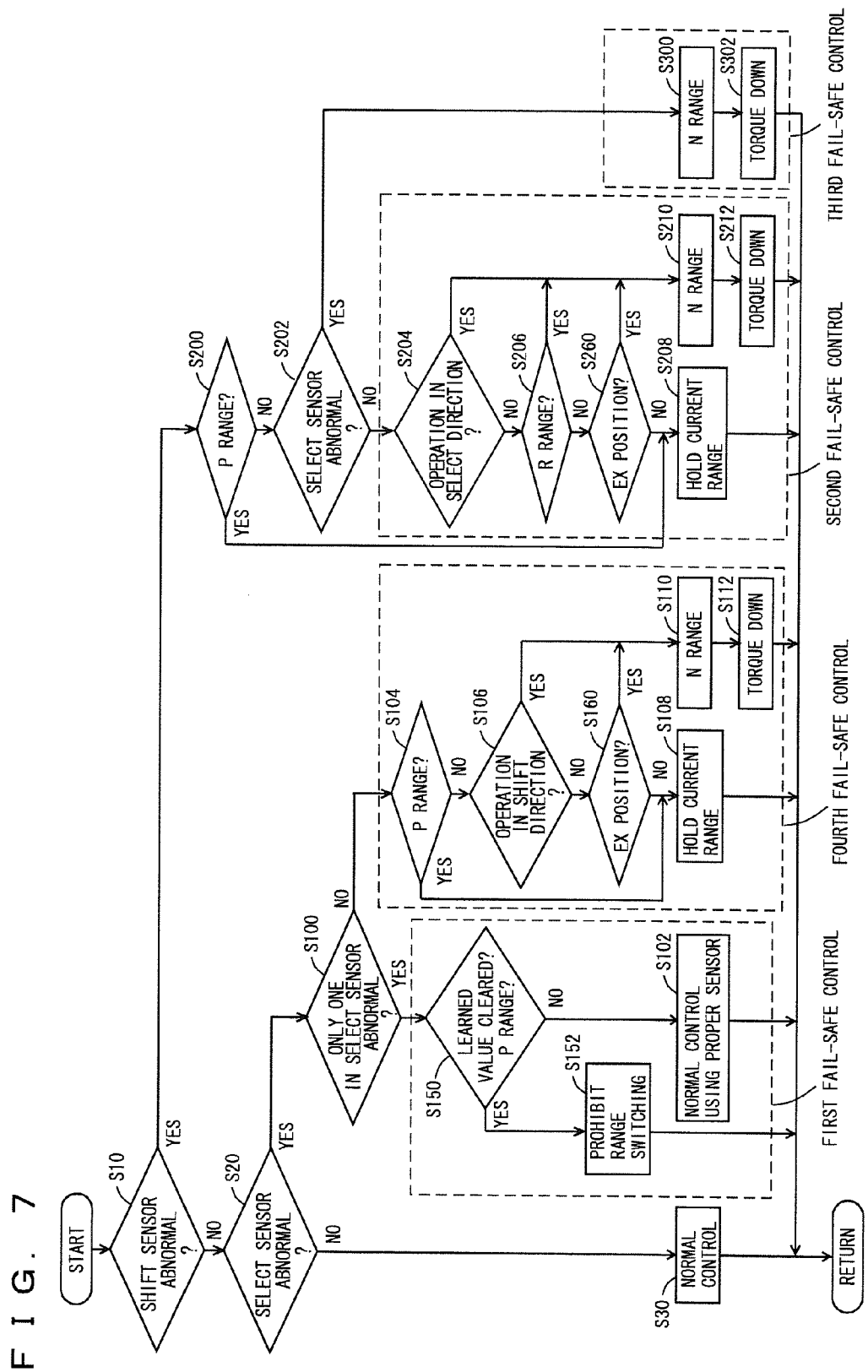
FIG. 7 is a third diagram representing an ECU processing flow.

As shown in FIG. 7, also the processing of S150 and S152 may be added to the processing flow of FIG. 6. Specifically, in the case where the first abnormality pattern is generated (YES at S100), HV-ECU 30 determines whether at least one of a first condition and second condition is met or not (S150), wherein the first condition corresponds to the case where the battery is removed from the vehicle, for example and the learned value of reference voltage value VC is erased, and the second condition corresponds to the case where the current range is at the P range (the shift range with the possibility of the battery being removed from the vehicle, and the learned value of reference voltage value VC being erased). When at least one of the conditions is met (YES at S150), switching of the shift range thereafter may be prohibited (S152). Accordingly, the driving is allowed without erroneous learning of reference voltage value VC.

In the processing of S150 of FIG. 7, determination can be made based on only the condition of one of the first condition corresponding to the learning value of reference voltage value VC being erased and the second condition corresponding to the case where the current range is at the P range.

The reason why determination is made based on whether the second condition of the current range being at the P range is met or not in the processing of S150 of FIG. 7 is set forth below. There is a possibility of the power of the vehicle being off when the current range is at the P range since the auto P control set forth above is employed in the vehicle of the present embodiment. Removing the battery when the power of the vehicle is off is envisaged. Thus, in view of the possibility of the battery being removed when the second condition is met (when the current range is at the P range), switching of the shift range is to be prohibited.

The present embodiment has been described based on, but not limited to, a right-hand drive vehicle. The present invention is also applicable to a left-hand drive vehicle. In a left-hand drive vehicle, the configuration of the shift gate is bilaterally symmetric to shift gate 260 of the right-hand drive vehicle. In this case, determination of the shift position is to be made based on a map as shown in FIG. 8, which is bilaterally symmetric to the aforementioned map of FIG. 2.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

The invention claimed is:

1. A control device for a vehicle running by an output torque from an automatic transmission changing a revolution of a drive force source, comprising:
    a movable unit operated by a driver of said vehicle, configured to be moved in a first direction associated with forward/reverse drive switching and a second direction not associated with the forward/reverse drive switching,
    a first detector including a first plurality of sensors detecting a position of said movable unit in said first direction, the first plurality of sensors including a first sensor and a second sensor, and
    a second detector including a second plurality of sensors detecting a position of said movable unit in said second direction, the second plurality of sensors including a third sensor and a fourth sensor, and
    a control unit controlling at least one of said drive force source and said automatic transmission based on detected results of said first detector and said second detector,
    said control unit determining whether each sensor of said first detector and each sensor of said second detector is abnormal or not, and in an event of a first abnormality where all the sensors of said first detector are normal and one or more, but not all, of the sensors of said second detector are abnormal, executing first control allowing said vehicle to drive with a first output torque from said automatic transmission, and in an event of a second abnormality where all the sensors of said second detector are normal and at least one or more of the sensors of said first detector are abnormal, executing second control allowing said vehicle to drive with a second output torque of the automatic transmission, wherein the second output torque is less than the first output torque.

2. The control device for a vehicle according to claim 1, wherein when the first abnormality is determined, said control unit executes as said first control, switching a control state of said automatic transmission based on both a detected result of said first detector and a detected result of a remaining normal sensor excluding any abnormal sensor of said second detector, and
    when the second abnormality is determined, said control unit executes as said second control, holding said automatic transmission at the control state identical to the control state prior to detection of an abnormality of said first detector until a predetermined condition is met, and then reducing the output torque of said automatic transmission to be lower than the first output torque of said first control after said predetermined condition is met.

3. The control device for a vehicle according to claim 2, wherein said predetermined condition includes a condition that an operation of said movable unit is detected.

4. The control device for a vehicle according to claim 2, wherein said predetermined condition includes a condition that the detected result of said second detector has changed.

5. The control device for a vehicle according to claim 2, wherein
    said movable unit is moved along a shift gate, and
    said predetermined condition includes a condition detecting that a position of said movable unit is at a position outside of a predetermined range corresponding to said shift gate.

6. The control device for a vehicle according to claim 2, wherein said reduction control includes at least one of control of setting the control state of said automatic transmission at a neutral state disconnecting power and control of reducing the output torque of said automatic transmission.

7. The control device for a vehicle according to claim 1, wherein
    the third sensor is configured to ascertain a position in said second direction, and the fourth sensor is configured to monitor for an abnormality in said third sensor,
    said control unit switches, when said first control is executed, a control state of said automatic transmission based on a detected result of said first detector and a detected result of said fourth sensor when, in said second detector, said third sensor is abnormal and said fourth is normal.

8. The control device for a vehicle according to claim 1, wherein said control unit executes, in an event of a third abnormality where an operation of said movable unit cannot be detected occurs in said first detector and said second detector, at least one of control of setting a control state of said automatic transmission to a neutral state disconnecting power, and control of reducing the output torque of said automatic transmission at a point of time of occurrence of said third abnormality.

9. The control device for a vehicle according to claim 8, wherein said control unit determines that said third abnormality has occurred when at least one or more of the sensors of said first detector are abnormal and at least one or more of the sensors of said second detector are abnormal.

10. The control device for a vehicle according to claim 1, wherein
    a corresponding relationship between a detected result of said first detector and the position in said first direction is learned based on a detected result of said first detector at a point of time of a detected result of said second detector changing, and
    when said first abnormality occurs, said control unit prohibits switching of a control state of said automatic transmission when in at least one of an event of a learning result of the position in said first direction being erased and an event of the control state of said automatic transmission being at a parking state locking a shaft of said vehicle.

11. The control device for a vehicle according to claim 1, wherein said control unit holds, in an event of a fourth abnormality where all the sensors of said first detector are normal and all the sensors of the second detector are abnormal, said automatic transmission at a control state identical to the control state prior to detection of abnormality of said second detector until an operation of said movable unit is detected after detection of abnormality in said second detector, and executes, at a point of time of detecting an operation of said movable unit, at least one of control of setting the control state of said automatic transmission at a neutral state of disconnecting power and control of reducing the torque output of said automatic transmission.

* * * * *